(12) United States Patent
Mehta (10) Patent No.: US 7,496,921 B2
(45) Date of Patent: Feb. 24, 2009

(54) PROCESSING BLOCK WITH INTEGRATED LIGHT WEIGHT MULTI-THREADING SUPPORT

(75) Inventor: Kalpesh D. Mehta, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 921 days.

(21) Appl. No.: 10/651,381

(22) Filed: Aug. 29, 2003

(65) Prior Publication Data

US 2005/0066150 A1 Mar. 24, 2005

(51) Int. Cl.
G06F 9/46 (2006.01)
G06F 9/40 (2006.01)
G06F 9/44 (2006.01)

(52) U.S. Cl. ............... 718/108; 718/102; 718/103; 712/216; 712/219; 712/220; 712/228

(58) Field of Classification Search ............ 718/1, 718/100–108; 712/1–300
See application file for complete search history.

(56) References Cited

U.S. PATENT DOCUMENTS

| | | | | |
|---|---|---|---|---|
| 4,991,169 A * | 2/1991 | Davis et al. | ............... | 370/463 |
| 5,404,469 A | 4/1995 | Chung et al. | | |
| 5,673,272 A * | 9/1997 | Proskauer et al. | ............ | 714/724 |
| 5,812,811 A * | 9/1998 | Dubey et al. | ............... | 712/216 |
| 5,815,727 A * | 9/1998 | Motomura | .................... | 712/1 |
| 5,913,059 A * | 6/1999 | Torii | ......................... | 718/104 |
| 5,933,627 A * | 8/1999 | Parady | ...................... | 712/228 |
| 5,978,838 A * | 11/1999 | Mohamed et al. | .......... | 709/208 |
| 6,233,643 B1 * | 5/2001 | Andrews et al. | ............ | 710/316 |
| 6,434,590 B1 * | 8/2002 | Blelloch et al. | ............ | 718/102 |
| 6,560,629 B1 | 5/2003 | Harris | | |
| 6,567,839 B1 * | 5/2003 | Borkenhagen et al. | ...... | 718/103 |
| 6,574,725 B1 * | 6/2003 | Kranich et al. | ............... | 712/31 |
| 6,580,961 B2 * | 6/2003 | Diggin et al. | ............... | 700/121 |
| 6,587,906 B2 | 7/2003 | Wolrich et al. | | |
| 6,609,193 B1 | 8/2003 | Douglas et al. | | |
| 6,624,818 B1 | 9/2003 | Mantor et al. | | |
| 6,625,635 B1 * | 9/2003 | Elnozahy | ..................... | 718/102 |
| 6,785,890 B2 * | 8/2004 | Kalafatis et al. | ............ | 718/108 |
| 6,850,961 B2 * | 2/2005 | Kalafatis et al. | ............ | 718/108 |
| 6,854,118 B2 * | 2/2005 | Kalafatis et al. | ............ | 718/108 |
| 6,971,104 B2 * | 11/2005 | Kalafatis et al. | ............ | 718/108 |
| 7,082,601 B2 * | 7/2006 | Ohsawa et al. | ............. | 717/149 |
| 7,089,340 B2 * | 8/2006 | Penkovski et al. | ......... | 710/200 |
| 7,136,417 B2 * | 11/2006 | Rodriguez | ............ | 375/240.29 |
| 2005/0050305 A1 * | 3/2005 | Kissell | ....................... | 712/220 |
| 2005/0132376 A1 * | 6/2005 | Rodgers et al. | ............ | 718/100 |

FOREIGN PATENT DOCUMENTS

WO WO 9931580 A1 * 6/1999

\* cited by examiner

Primary Examiner—Meng-Ai An
Assistant Examiner—Jennifer N To
(74) Attorney, Agent, or Firm—Schwabe, Williamson & Wyatt, P.C.

(57) ABSTRACT

A processing block is equipped with a storage to facilitate storage and maintenance of a thread switching structure to provide multi-threading support in a light-weight manner. In various embodiments, the structure includes a current thread identifier, and a thread array of thread entries describing the threads to be executed interleavingly. Further, in various embodiments, the processing block includes an execution sub-block and a thread management sub-block equipped to support at least a create thread, a thread execution termination, and a thread execution switching instruction.

30 Claims, 7 Drawing Sheets

Fig. 1

```
thread0: -- primary thread - thread0
        crth thread1, GR8, GR8, -QPN0;
202 ~   crth thread2, GR10, -QPN1;
        crth thread3, GR11, -QPW0;
        crth thread4, GR12, -QPW1;
204 ~   kill;

thread1:                                  -- thread 1
        pack GR8, GR9, QPN0;
206 ~   swtch;

thread2:                                  -- thread 2
        shr GR10, #sftcnt, QPN1;
        swtch;

thread3:                                  -- thread 3
        mpy GR11, #scale, LR1;
        shr LR1, sftcnt, QPW0;
        swtch;

thread4:                                  -- thread 4
        add offset, GR12, QPW1;
        swtch;
```

PROCESSING BLOCK WITH INTEGRATED LIGHT WEIGHT MULTI-THREADING SUPPORT

BACKGROUND OF THE INVENTION

Numerous data processing applications require a relatively small number of unique operations to be repeatedly performed for a large volume of data. For example, in a number of media applications, such as processing of video data, a relatively small number of unique operations are repeatedly performed on many blocks of many frames/pictures of video data.

As integrated circuit technology continues to advance, it is desirable to have media processors that are custom designed for such type of processing. In particular, it is desirable to have media processors designed with multiple data processing blocks equipped to repeatedly perform these relatively small number of operations for the large volume of data, in a cooperative and at least partially parallel manner.

Further, it is desirable for each of the data processing blocks to operate with a high degree of efficiency. Thus, it is also desirable for the data processing blocks to be able to support multi-threading (interleaved execution of multiple threads of instructions), without the typical significant resource overhead required to support context switching (saving and restoring the various thread states as execution switches back and forth between the different threads of instructions).

BRIEF DESCRIPTION OF THE DRAWINGS

Embodiments of the present invention will be described by way of the accompanying drawings in which like references denote similar elements, and in which.

DETAILED DESCRIPTION OF EMBODIMENTS OF THE INVENTION

Embodiments of the present invention include but are not limited to processing blocks equipped with light-weight multi-threading support, signal processing macroblocks formed with such processing blocks, as well as media processors formed with such signal processing macroblocks.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
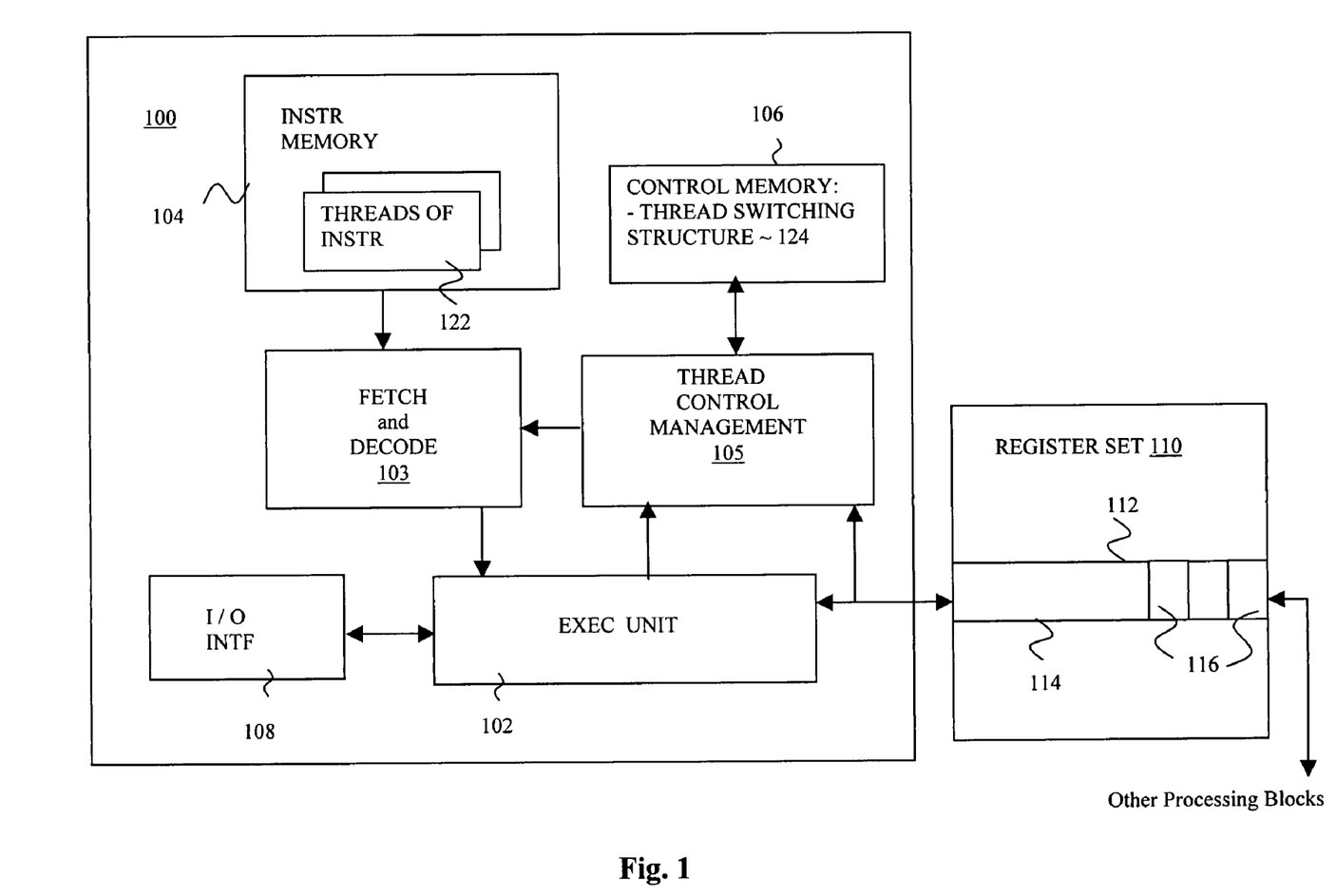
FIG. 1 illustrates an overview of a processing block of the present invention, in accordance with one embodiment.

Referring now to FIG. 1 wherein an overview of a processing block of the present invention, in accordance with one embodiment, is illustrated. As shown, for the embodiment, processing block 100, coupled to external register set 110, may include execution unit 102, fetch and decode unit 103, instruction memory 104, thread management unit 105, control memory 106, and I/O interface 108, coupled to each other as shown.

Instruction memory 104 may be employed to stage (store), various threads 122 of instructions to be executed interleavingly. Control memory 106 may be employed to store a relatively simple thread switching structure 124, to allow thread management unit 105 to facilitate interleaved execution of threads 122 for processing block 100, without requiring significant amount of resources to track the thread states (light-weight).

The resulting benefit is processing block 100 becoming highly efficient, executing different threads of instructions interleavingly, but remain compact and small. The efficiency and compactness makes processing block 100 particularly suitable for multiple replication to form a signal processing macroblock on an integrated circuit, which in turn, may be replicated multiple times on the same integrated circuit, to form a highly efficient and powerful single chip media processor.

In various embodiments, instruction memory 104 and control memory 106 may be static or dynamic random access memory (SRAM and DRAM). In other embodiments, instruction memory 104 and control memory 106 may be electrically eraseable read-only memory (EEPROM) or flash memory. In yet other embodiments, instruction memory 104 and control memory 106 may be memory of other known types or to be designed.

Fetch and decode unit 103 may be employed to fetch and decode instructions of the various threads 122, under the control of thread management unit 105. Except for the fact that fetch and decode unit 103 operates under the control of thread management unit 106, fetch and decode unit 103 represents a broad range of such element known in the art or to be designed.

Execution unit 102 may be employed to execute instructions. Execution unit 102 may include an arithmetic logic unit (ALU). For the embodiment, execution unit 102 may further include support for notifying thread management unit 105 of execution of certain thread switching related instructions, to be described more fully below. Beyond that, the exact makeup of execution unit 102 may be embodiment dependent. For example, for computational intensive processing blocks, execution unit 102 may be endowed with multiplication units and/or floating point processing supports. Thus, execution unit 102 also represents a broad range of such elements known in the art or to be designed.

Thread management unit 105 may be employed to control the interleaved execution of threads 122, including in particular the fetching and execution of a number of thread switching related instructions. In one embodiment, these thread switching related instructions may include a create thread instruction (crth), a thread termination instruction (kill), and a thread switching instruction (switch). The meaning, usage, and the operational logic of thread management unit 105 in support of these instructions, including the operations performed on thread switching structure 124 as part of the fetching and execution of these instructions, will be further described below.

Register set 110 may include a number of registers 112 to store operand data. For the embodiment, to facilitate cooperative processing, as described earlier, register set 110 may be an external set of registers, sharable by a number of processing blocks. In various embodiments, different non-overlapping subsets of registers 112 may be used by the different executing threads of a processing block. The practice reduces the need of resources to facilitate thread switching.

Further, for the embodiment, to facilitate cooperating processing by multiple processing blocks, each register 112 may include a number of data valid indicators 116, in addition to data storage area 114. Each data valid indicator 116 (set by the executing threads) indicates whether the data stored in data storage area 114 is valid for a corresponding processing block. Thus, thread management unit 105 of processing block 100 may determine whether a thread is ready for execution, based on the states of data valid indicators 116 corresponding to processing block 100 of the subset of registers 112 used by the thread.

However, alternate embodiments may be practiced without the coordinated practice of having the threads of a processing block employing different non-overlapping subsets of the external registers, provided corresponding resources required to save and restore the proper states of the overlapped registers are provided. Further, alternate embodiments may be practiced without thread readiness determination or with thread readiness being determined in other manners.

Similarly, while the embodiment is designed to allow multiple processing blocks 100 be employed to form a highly efficient processing macroblock, other embodiments may be practiced having only one processing block 100.

In various embodiments, I/O interface 108 may be a configurable interface configurable to be either an input interface or an output interface. For the former case, processing block 100 effectively becomes an input processing block, whereas for the latter case, processing block 100 effectively becomes an output processing block. One example usage of these example input or output processing blocks will be described later.

Figure 2:
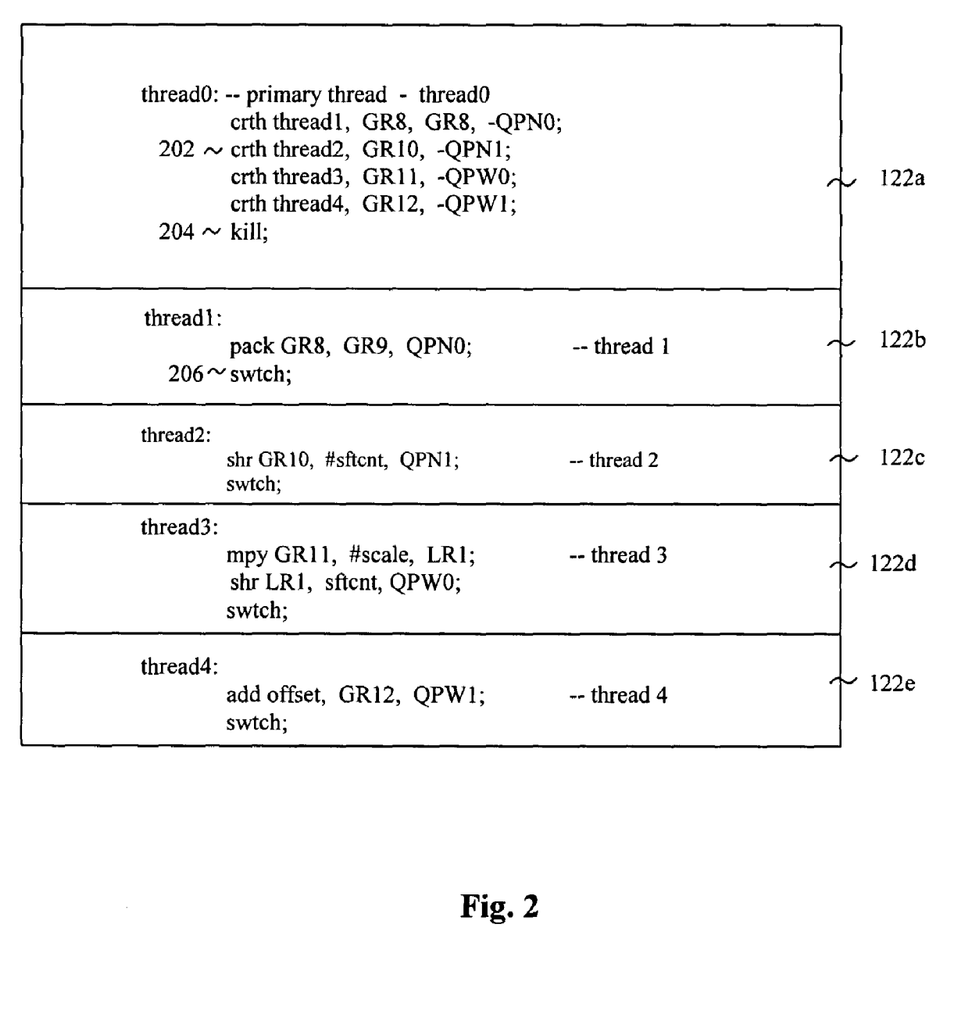
FIG. 2 illustrates a number of example "simple" threads of FIG. 1 in further details, in accordance with one embodiment.

FIG. 2 illustrates a number of example threads of instructions, threads 122a-122e, in accordance with one embodiment. Of particular interest, for the embodiment, are three thread switching related instructions 202-206.

Instruction 202 is a create thread instruction, allowing a thread, e.g. thread0 122a, to spawn the execution of other threads, e.g. thread1-thread4 122b-122e. For the embodiment, thread instruction 202 may include specifications of the dependencies of the thread being spawn. These dependencies may include the subset of registers used by the thread being spawn. These dependencies may also include the I/O ports used by the thread being spawn.

Instruction 204 is a thread execution termination instruction, allowing a thread, e.g. thread0 122a, to terminate its own execution.

Instruction 206 is a thread execution switch instruction, allowing a thread, e.g. thread1-thread4 122b-122e, to cause execution to be switched to another thread.

As alluded to earlier, and to be described in more detail below, thread management unit 105 includes support for the execution of each of these three instructions.

Other illustrated instructions, "pack", "shr", "mpy" and "add" are representative of a broad range of "arithmetic" instructions that may be also supported by execution unit 102. Example "pack" instruction represents a convention "pack" function instruction to perform a packing operation on its operands. Example "shr", "mpy" and "add" instructions represent convention "shift right", "multiply" and "add" arithmetic operation instructions to perform the corresponding convention shifting, multiplication and adding operation on the respective operands.

Figure 3:
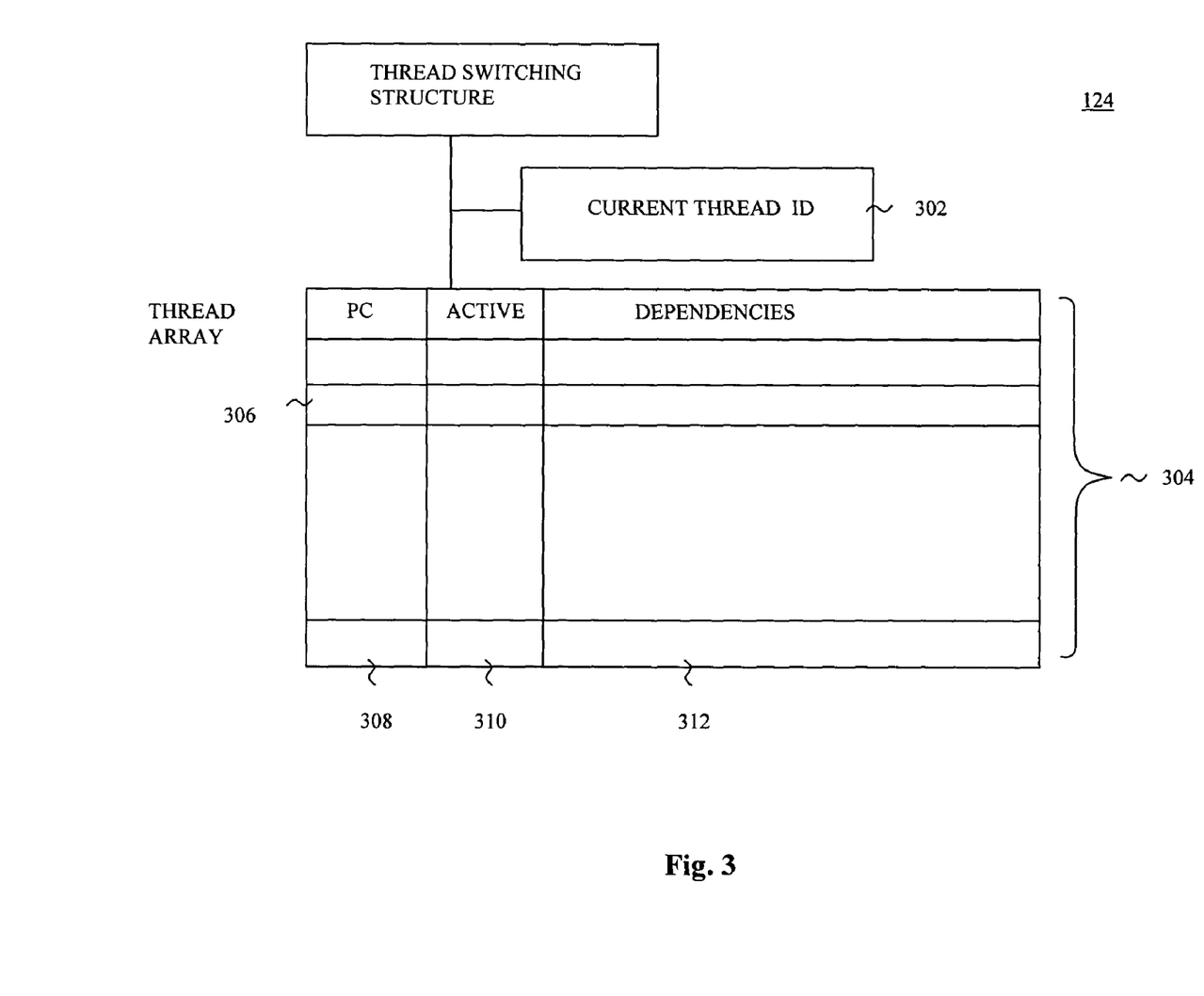
FIG. 3 illustrates the thread switching structure of FIG. 1 in further details, in accordance with one embodiment.

FIG. 3 illustrates the thread switching structure of FIG. 1 in further details, in accordance with one embodiment. As illustrated, for the embodiment, thread switching structure 124 may include a current thread identifier 302 to identify a current one among the plurality of threads 122 as the current thread being executed by execution unit 102.

For the embodiment, thread switching structure 124 may further include thread array 304 for storing a number of thread entries 306, one per thread, to correspondingly describe threads 122 being executed interleavingly.

For the embodiment, each thread entry 306 may include a thread program counter (PC) 308 to identify the next instruction of the corresponding thread to be executed (when the corresponding thread becomes the current thread to be executed).

Further, for the embodiment, each thread entry 306 may include an activeness indicator 310 indicating whether the corresponding thread is in an active state or in an inactive state. For the embodiment, the corresponding thread will be included among the thread to be considered for execution, when execution is being switched from one thread to another thread, if the activeness indicator 310 of the corresponding thread indicates an active state.

For the embodiment, each entry 306 may further include other information describing the corresponding thread 122, e.g. the earlier described dependency information of the corresponding thread 122, including but are not limited to the subset of the external registers, and the I/O ports used by the corresponding thread 122.

Figure 4A:
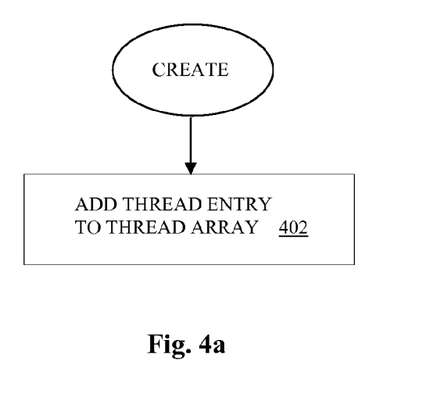
FIGS. 4a-4c illustrate the relevant operational logic of the thread management unit of FIG. 1, in accordance with one embodiment.
Figure 4B:
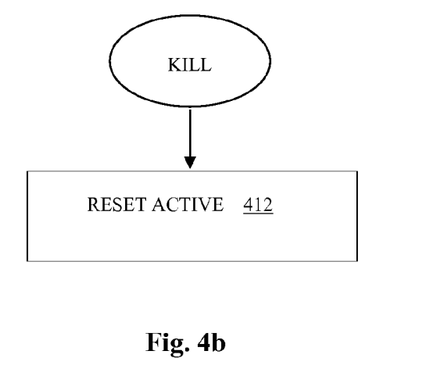
Figure 4C:
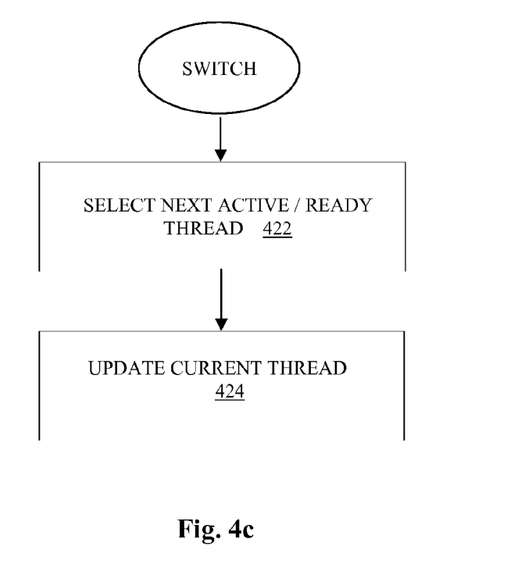

FIGS. 4a-4c illustrate the relevant operational logic of thread management unit 105 in support of the earlier described instructions for facilitating light-weight multithreading, in accordance with one embodiment.

As illustrated in FIG. 4a, on notification by execution unit 102 of the execution of the create thread instruction (crth), thread management unit 105 adds a thread entry 306 in thread array 304 for the thread being spawned for execution, block 402. As described earlier, for various embodiments, the thread entry 306 may include a PC and an activeness indicator for the thread being spawned for execution.

As illustrated in FIG. 4b, for the embodiment, on notification by execution unit 102 of the execution of the thread execution termination instruction (kill), thread management unit 105 resets the activeness indicator of the thread entry 306 in thread array 304 for the thread, which execution is being terminated, block 412.

As illustrated in FIG. 4c, for the embodiment, on notification by execution unit 102 of the execution of the thread execution switching instruction (swtch), thread management unit 105 selects another thread, among the active and ready ones of threads 122, to be the current thread, block 422. The selection may be made in any one of a number of manners, including but not limited to a round-robin based manner, a fixed priority based manner, and a rotating priority based manner.

On selecting another active and ready thread to be the current thread, thread management unit 105 updates the current thread identifier 302 to identify the selected thread as the current thread to be executed, block 424.

Thereafter, thread management unit 105 instructs fetch and decode unit 103 to fetch and decode instructions for the now current thread, in accordance with the PC of the current thread.

Figure 5:
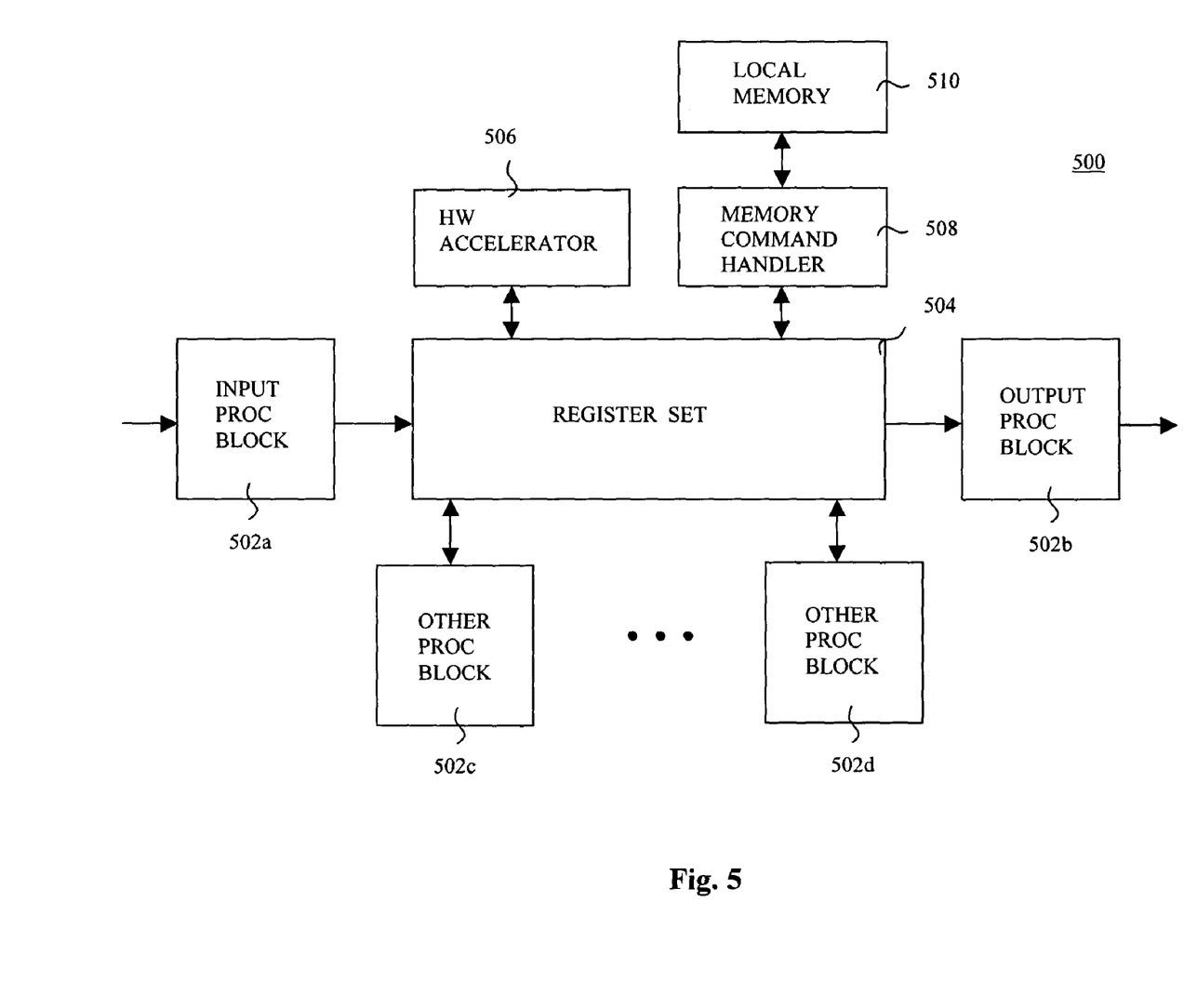
FIG. 5 illustrates a signal processing macroblock formed employing various variants of the processing block of FIG. 1, in accordance with one embodiment.

FIG. 5 illustrates a signal processing macroblock formed using multiple ones of the earlier described processing block, in accordance with one embodiment. As illustrated, signal processing macroblock 500 may include a number of variants of the processing block of FIG. 1, processing blocks 502a-502d, register set 504, hardware accelerator 506, memory command handler 508, and local memory 510, coupled to each other as shown.

For the embodiment, processing blocks 502a-502b are input and output processing blocks respectively, i.e. processing block 100 with input/output interface 108 configured as an input interface in the former case, and as an output interface in the latter case. Processing blocks 502c-502d, on the other hand, are variants of the earlier described computational processing blocks.

Register set 504 may be a variant of register set 110 of FIG. 1, and local memory 510 may be any one of a number of memory known in the art or to be designed. Memory command handler 508 may be any one of such element known in the art or to be designed.

In various embodiments, hardware accelerator 506 may include an address generator equipped to generate access addresses for accessing a unit of data in a non-sequential access manner, e.g. a zig-zag pattern. The address generator is the subject matter of co-pending application Ser. No. 10/651,379, entitled "Non-sequential Access Pattern Based Address Generator", contemporaneously filed with the present application.

During operation, data to be processed are inputted in the signal processing macroblock 500, more particularly, registers of register set 504 and/or local memory 510, through input processing block 502a. The inputted data, in turn, are processed by selected ones of processing blocks 502a-502d, with the processing results being placed back in the registers of register set 504 and/or local memory 510. The processing results, in due course, are outputted from the registers of register set 504 and/or local memory 510, through output processing block 502b.

Figure 6:
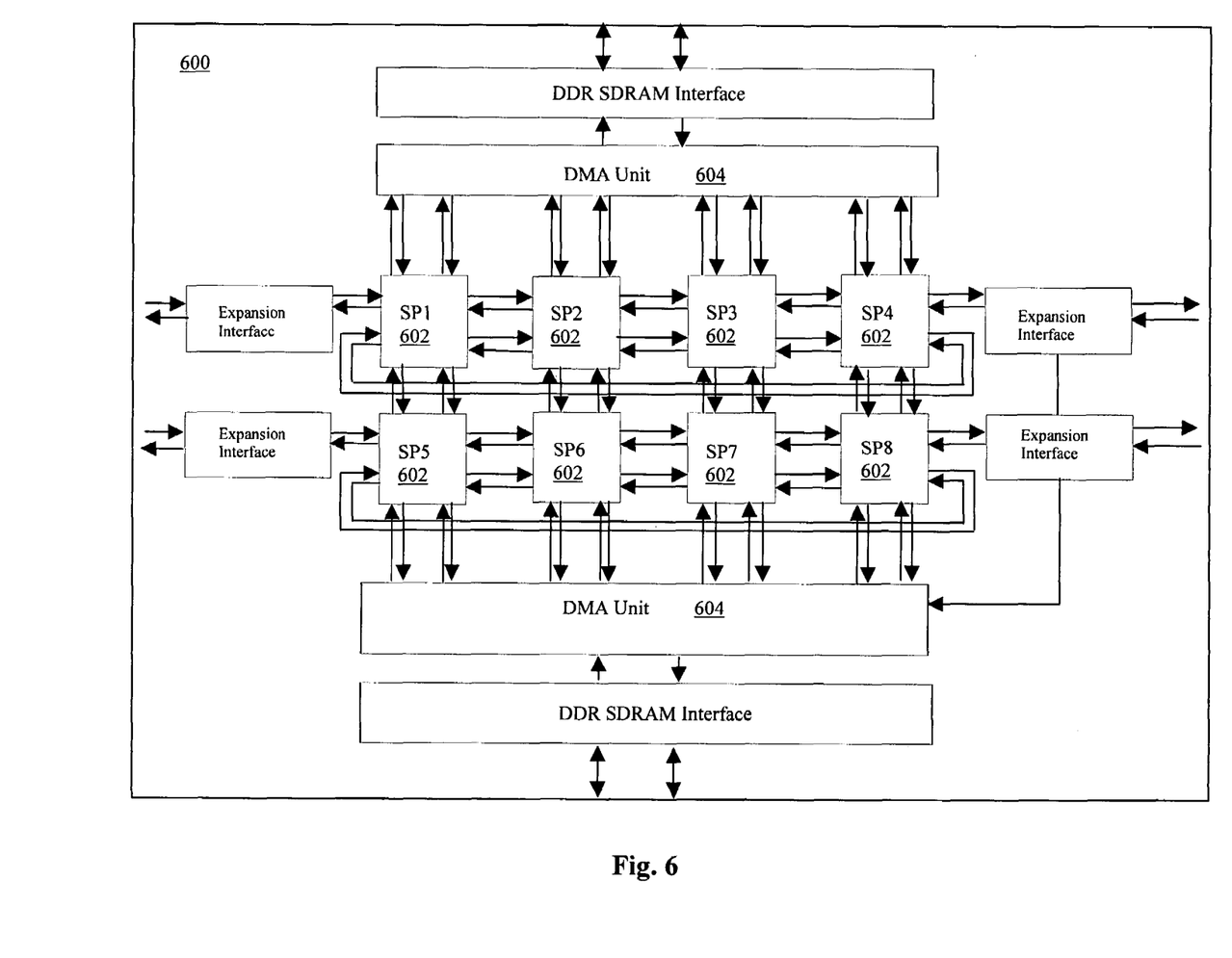
FIG. 6 illustrates a digital media processor incorporated with a number of the signal processing macroblocks of FIG. 5, in accordance with one example application of the present invention.

FIG. 6 illustrates a digital media processor incorporated with the teachings of the present invention, in accordance with one embodiment. As illustrated, digital media processor 600 may include a number of signal processors (SP) 602, and a number of direct memory access (DMA) units 604, coupled to each other as shown.

SP 602 may be equipped to cooperate with each other to process digital media data. In various embodiments, one or more of SP 602 may be variants of signal processor 500 of FIG. 5.

DMA units 604 may be equipped to retrieve the digital media data from external memory for SP 602.

In one embodiment, the above described digital media processor 600 may be disposed in a single integrated circuit.

Figure 7:
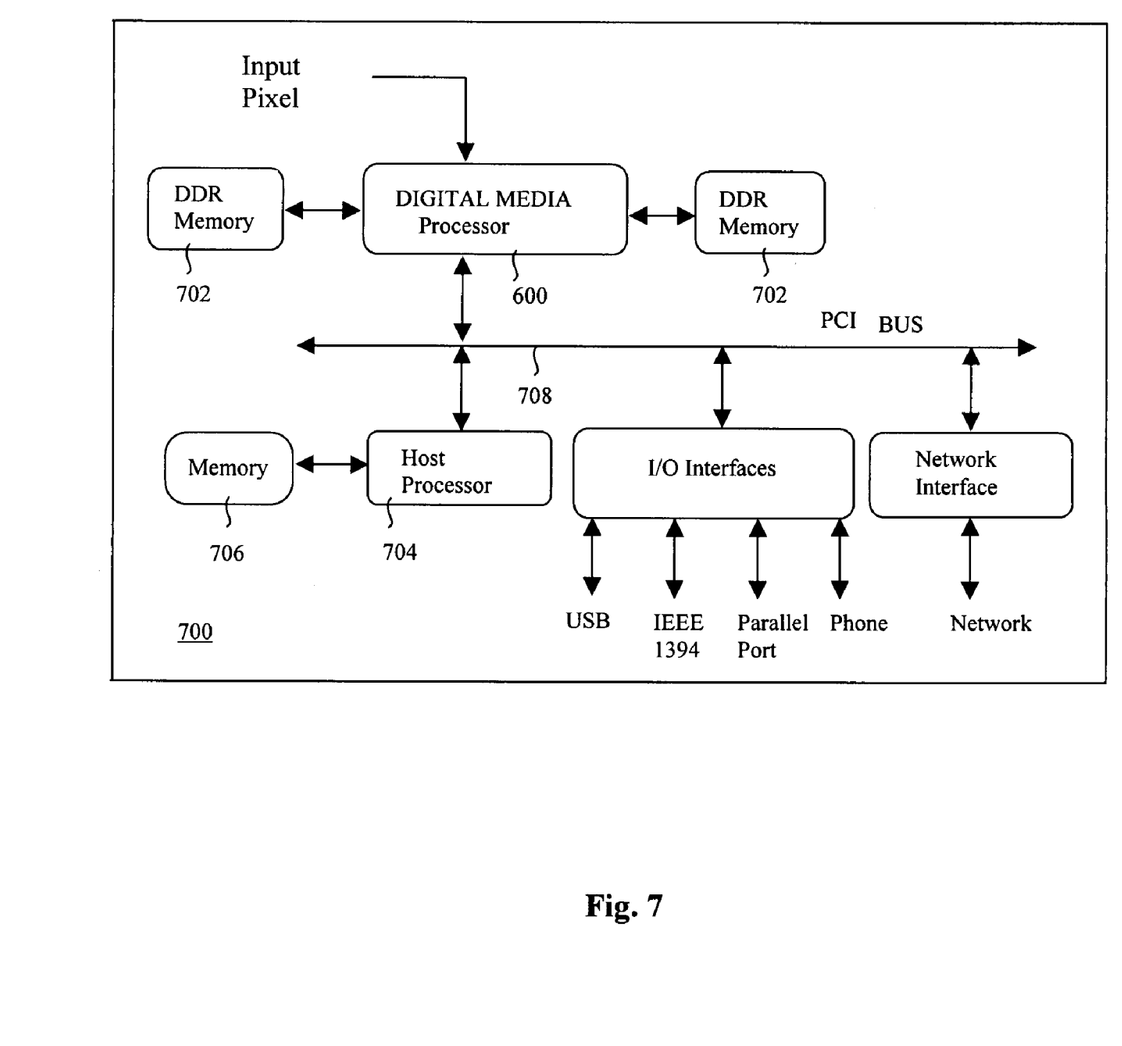
FIG. 7 illustrates a digital system incorporated with the digital media processor of FIG. 6, in accordance with one example application of the present invention.

FIG. 7 illustrates a digital system incorporated with the teachings of the present invention, in accordance with one embodiment. Digital system 700 may include digital media processor 600 of FIG. 6, DDR memory 702, host processor 704, memory 706 and bus 708 coupled to each other as shown.

In other words, one or more signal processors of the digital media processor 600 may be equipped with processing blocks incorporated with the earlier described light weight multi-threading support.

Otherwise, DDR memory 702, memory 706, host processor 704 and bus 708 all represent a broad range of these elements known in the art or to be designed.

In various embodiments, digital system 700 may be a server, a desktop computer, a laptop computer, a tablet computer, a pocket PC, a palm sized personal digital assistant, a wireless mobile phone, a set-top box, an entertainment control console, a video recorder, or a video player.

Thus, it can be seen from the above descriptions, a novel processing block and a number of its example applications have been described.

While the present invention has been described in terms of the foregoing embodiments, those skilled in the art will recognize that the invention is not limited to the embodiments described. Other embodiments may be practiced with modification and alteration within the spirit and scope of the appended claims.

Thus, the description is to be regarded as illustrative instead of restrictive.

What is claimed is:

1. An apparatus comprising:
    a memory configured to store a thread switching structure;
    an execution block configured to execute instructions; and
    a thread management block coupled to the memory and the execution block, the thread management block equipped to maintain a thread switching structure in the memory to facilitate interleaving execution of a plurality of threads of instructions by the execution block, with the thread switching structure including a current thread identifier identifying one of the plurality of threads as a current thread being currently executed by the execution block, and a thread array of thread entries, one per thread, describing at least a plurality of registers of an external set of registers, on which the corresponding described thread depends, each thread entry being created and added to the thread array by the thread management block as part of the execution of a create thread instruction of a thread to spawn execution of another thread, and wherein the thread management block is further equipped to select a non-current one of the plurality of threads to be the new current thread to be executed on one of a round-robin basis, a fixed priority basis, or a rotating priority basis and switch execution to a first instruction of the new current thread as part of a thread switching instruction of a thread to instruct the execution block to switch execution to another thread.

2. The apparatus of claim 1, wherein each thread entry comprises a thread program counter to identify an instruction of the corresponding described thread as a current instruction to be executed, when the corresponding described thread is being executed.

3. The apparatus of claim 1, wherein each thread entry comprises an activeness indicator indicating whether the corresponding described thread is currently in an active state or an inactive state, where the corresponding described thread is to be included among the threads to be interleavingly executed by the execution sub-block, while the thread is in the active state, and not included, while the thread is in the inactive state.

4. The apparatus of claim 3, wherein the thread management block is equipped to reset the activeness indicator of a thread from the active state to the inactive state, as part of the execution of a thread termination instruction of a thread terminating its own execution.

5. The apparatus of claim 1, wherein the input/output interface is configured to couple the apparatus to an external set of registers.

6. The apparatus of claim 1, wherein the processing block further comprises an input/output interface configurable to be a selected one of an input interface and an output interface to particularize the processing block as a selected one of an input processing block and an output processing block of a signal processing macroblock.

7. The apparatus of claim 1, further comprising another storage block coupled to the execution block, to store instructions of the threads.

8. A method comprising:
fetching a first instruction of a first thread of instructions; and
executing, via an execution sub-block, the first instruction, and as part of the execution of the first instruction, adding a first thread entry in a thread array of a thread switching structure, wherein the first thread entry comprises thread dependency information describing at least a plurality of registers of an external set of registers, on which the first thread depends, if the first instruction is a create thread instruction spawning interleaved execution of a second thread of instructions with execution of other threads, and selecting the second thread from among a plurality of active threads, updating the current thread identifier to identify the second thread as a new current thread to be executed, replacing the first thread, and transferring execution to an instruction of the second thread instead, if the first instruction is a thread execution switching instruction, and execution of the second thread has previously been spawned, wherein said selection of the second tread from among a plurality of active threads comprises selecting the second thread in a selected one of a round-robin basis, a fixed priority basis, and a rotating priority basis, the thread switching structure being disposed and maintained within a memory by a thread management sub-block to facilitate interleaved execution of threads of instructions by the execution sub-block, and the first thread entry describing the second thread.

9. The method of claim 8, wherein the first thread entry comprises a thread program counter to identify an instruction of the second thread as a current instruction to be executed, when the second thread is being executed.

10. The method of claim 8, wherein the first thread entry comprises an activeness indicator indicating whether the second thread is currently in an active state or an inactive state, where the second thread is to be included among the threads to be interleavingly executed, while the second thread is in the active state, and not included, while the second thread is in the inactive state.

11. The method of claim 8, wherein said execution of the first instruction includes resetting an activeness indicator of a second thread entry of the thread array from indicating an active state to indicating an inactive state instead, if the first instruction is a thread termination instruction terminating execution of the first thread, the second thread entry being corresponding to the first thread.

12. A signal processing macroblock comprising:
a set of registers; and
at least a selected one of
an input processing block coupled to the set of registers, including an input interface, execution and thread management facilities equipped to support interleaved execution of multiple threads of instructions, the thread management facilities including a thread management sub-block equipped to maintain a thread switching structure including a current thread identifier to identify one of the plurality of threads as a thread to be executed, and a thread array of thread entries, one per thread, configured to describe the set of registers on which the corresponding threads depend, each thread entry to be created and added to the thread array by the thread management sub-block based on a create thread instruction, and wherein the thread management sub-block is further configured to select another thread of the plurality of threads to be executed based on a thread switching instruction, wherein the thread switching instruction may select a thread based on fixed priority basis, a round robin basis, or a rotating priority basis; and
an output processing block coupled to the set of registers, including an output interface, execution and thread management facilities equipped to support interleaved execution of multiple threads of instructions, the thread management facilities including a thread management sub-block equipped to maintain a thread switching structure and create and add thread entries corresponding to the multiple threads of instructions to a thread array within the thread switching structure.

13. The signal processing macroblock of claim 12, wherein the signal processing macroblock further comprises a computation block coupled to the set of registers, including execution and thread management facilitates equipped to support interleaved execution of multiple threads of instructions, including instructions performing mathematical operations.

14. The signal processing macroblock of claim 13, wherein at least a selected one of the facilities of the input processing block, the output processing block and the computation block, equipped to support interleaved execution of multiple threads, includes a storage sub-block to store a thread switching structure that includes a current thread identifier identifying one of the multiple threads as a current thread to be executed, and a thread array including thread entries describing corresponding ones of the multiple threads.

15. The signal processing macroblock of claim 14, wherein at least a selected one of the facilities of the input processing block, the output processing block and the computation block, equipped to support interleaved execution of multiple threads, further includes an execution sub-block equipped to create a thread entry in the thread array for a thread as part of the execution of a create thread instruction spawning interleaved execution of the thread.

16. The signal processing macroblock of claim 14, wherein at least a selected one of the facilities of the input processing block, the output processing block and the computation block, equipped to support interleaved execution of multiple threads, further includes an execution sub-block equipped to reset an activeness indicator of a thread entry in the thread array for a thread from indicating an active state to indicating an inactive state as part of the execution of a thread termination instruction terminating execution of the thread.

17. The signal processing macroblock of claim 14, wherein at least a selected one of the facilities of the input processing block, the output processing block and the computation block, equipped to support interleaved execution of multiple threads, further includes an execution sub-block equipped to select a thread as a new current thread to be executed, updating a current thread identifier of the thread switching structure to identify the selected thread, and switching to execute an instruction of the selected thread, as part of the execution of a thread execution switching instruction.

18. A media processor comprising:
a direct memory access unit to access media data;
a plurality of signal processing units coupled to the direct memory access unit to process the accessed media data, at least a first of which signal processing units comprising
a set of registers,
an input processing block coupled to the set of registers, including an input interface, execution and thread management facilities equipped to support interleaved execution of multiple threads of instructions, the thread management facilities including a thread management sub-block equipped to maintain a thread switching structure including a current thread identifier to identify one of the plurality of threads as a thread to be executed, and a thread array of thread entries, one per thread, configured to describe the set of registers on which the corresponding threads depend, each thread entry to be created and added to the thread array by the thread management sub-block based on a create thread instruction, and wherein the thread management sub-block is further configured to select another thread of the plurality of threads to be executed based on a thread switching instruction, wherein the thread switching instruction may select a thread based on a fixed priority basis, a round robin basis, or a rotating priority basis; and
an output processing block coupled to the set of registers, including an output interface, execution and thread management facilities equipped to support interleaved execution of multiple threads of instructions, the thread management facilities including a thread management sub-block equipped to maintain a thread switching structure and create and add thread entries corresponding to the multiple threads of instructions to a thread array within the thread switching structure.

19. The media processor of claim 18, wherein the first signal processing unit further comprises a computation block coupled to the set of registers, including execution and thread management facilitates equipped to support interleaved execution of multiple threads of instructions, including instructions performing mathematical operations.

20. The media processor of claim 19, wherein at least a selected one of the facilities of the input processing block, the output processing block and the computation block, equipped to support interleaved execution of multiple threads, includes a storage sub-block to store a thread switching structure that includes a current thread identifier identifying one of the multiple threads as a current thread to be executed, and a thread array including thread entries describing corresponding ones of the multiple threads.

21. The media processor of claim 19, wherein at least a selected one of the facilities of the input processing block, the output processing block and the computation block, equipped to support interleaved execution of multiple threads, further includes an execution sub-block equipped to create a thread entry in the thread array for a thread as part of the execution of a create thread instruction spawning interleaved execution of the thread.

22. The media processor of claim 19, wherein at least a selected one of the facilities of the input processing block, the output processing block and the computation block, equipped to support interleaved execution of multiple threads, further includes an execution sub-block equipped to reset an activeness indicator of a thread entry in the thread array for a thread from indicating an active state to indicating an inactive state as part of the execution of a thread termination instruction terminating execution of the thread.

23. The media processor of claim 19, wherein at least a selected one of the facilities of the input processing block, the output processing block and the computation block, equipped to support interleaved execution of multiple threads, further includes an execution sub-block equipped to select a thread as a new current thread to be executed, updating a current thread identifier of the thread switching structure to identify the selected thread, and switching to execute an instruction of the selected thread, as part of the execution of a thread execution switching instruction.

24. A system comprising:
a host processor;
first memory coupled to the host processor;
second memory;
a media processor coupled to the second memory and the host processor, the media processor having at least
a direct memory access unit to access media data, and
a plurality of signal processing units coupled to the direct memory access unit to process the accessed media, at least a first of which signal processing units comprising
a set of registers,
an input processing block coupled to the set of registers, including an input interface, execution and thread management facilities equipped to support interleaved execution of multiple threads of instructions, the thread management facilities including a thread management sub-block equipped to maintain a thread switching structure including a current thread identifier to identify one of the plurality of threads as a thread to be executed, and a thread array of thread entries, one per thread, configured to describe the set of registers on which the corresponding threads depend, each thread entry to be created and added to the thread array by the thread management sub-block based on a create thread instruction, and wherein the thread management sub-block is further configured to select another thread of the plurality of threads to be executed based on a thread switching instruction, wherein the thread switching instruction may select a thread based on a fixed priority basis, a round robin basis, or a rotating priority basis; and
an output processing block coupled to the set of registers, including an output interface, execution and thread management facilities equipped to support interleaved execution of multiple threads of instructions, the thread management facilities including a thread management sub-block equipped to maintain a thread switching structure and create and add thread entries corresponding to the multiple threads of instructions to a thread array within the thread switching structure;.

25. The system of claim 24, wherein the first signal processing unit of the media processor further comprises a computation block coupled to the set of registers, including execution and thread management facilitates equipped to support interleaved execution of multiple threads of instructions, including instructions performing mathematical operations.

26. The system of claim 25, wherein at least a selected one of the facilities of the input processing block, the output processing block and the computation block, equipped to support interleaved execution of multiple threads, includes a storage sub-block to store a thread switching structure that includes a current thread identifier identifying one of the multiple threads as a current thread to be executed, and a thread array including thread entries describing corresponding ones of the multiple threads.

27. The system of claim 25, wherein at least a selected one of the facilities of the input processing block, the output processing block and the computation block, equipped to support interleaved execution of multiple threads, further includes an execution sub-block equipped to create a thread entry in the thread array for a thread as part of the execution of a create thread instruction spawning interleaved execution of the thread.

28. The system of claim 25, wherein at least a selected one of the facilities of the input processing block, the output processing block and the computation block, equipped to support interleaved execution of multiple threads, further includes an execution sub-block equipped to reset an activeness indicator of a thread entry in the thread array for a thread from indicating an active state to indicating an inactive state as part of the execution of a thread termination instruction terminating execution of the thread.

29. The system of claim 25, wherein at least a selected one of the facilities of the input processing block, the output processing block and the computation block, equipped to support interleaved execution of multiple threads, further includes an execution sub-block equipped to select a thread as a new current thread to be executed, updating a current thread identifier of the thread switching structure to identify the selected thread, and switching to execute an instruction of the selected thread, as part of the execution of a thread execution switching instruction.

30. The system of claim 24, wherein the system is a selected one of a server, a palm sized personal digital assistant, a wireless mobile phone, a set-top box, an entertainment control console, a video recorder, or a video player.

* * * * *